(12) United States Patent
Bae (10) Patent No.: US 12,513,069 B2
(45) Date of Patent: Dec. 30, 2025

(54) METHOD AND APPARATUS FOR CONTROLLING TRANSMISSION OF PACKET

(71) Applicant: SAMSUNG ELECTRONICS CO., LTD., Suwon-si (KR)

(72) Inventor: Soukjin Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 655 days.

(21) Appl. No.: 17/891,808

(22) Filed: Aug. 19, 2022

(65) Prior Publication Data
US 2023/0046243 A1 Feb. 16, 2023

Related U.S. Application Data

(63) Continuation of application No. PCT/KR2022/010975, filed on Jul. 26, 2022.

(30) Foreign Application Priority Data

Aug. 10, 2021 (KR) .................. 10-2021-0105005

(51) Int. Cl.
*H04L 43/0852* (2022.01)
*G06F 1/08* (2006.01)

(52) U.S. Cl.
CPC ............ *H04L 43/0852* (2013.01); *G06F 1/08* (2013.01)

(58) Field of Classification Search
None
See application file for complete search history.

(56) References Cited

U.S. PATENT DOCUMENTS

| 7,340,615 B2 | 3/2008 | Krantz et al. |
| 9,882,831 B2 | 1/2018 | Smirnov |

(Continued)

FOREIGN PATENT DOCUMENTS

| JP | 3915007 B2 | 5/2007 |
| JP | 2015-2397 A | 1/2015 |

(Continued)

OTHER PUBLICATIONS

International Search Report (PCT/ISA/210) dated Oct. 28, 2022 issued by the International Searching Authority in International Application No. PCT/KR2022/010975.

*Primary Examiner* — Matthew G Marini
(74) *Attorney, Agent, or Firm* — Sughrue Mion, PLLC (57) ABSTRACT

An electronic device according to various embodiments may include a memory storing a table containing a delay time in a process of receiving a network packet and an operation corresponding to the delay time, and a processor operatively connected to the memory. The memory may store instructions, which upon execution, control the processor to measure a delay time for each step based on a time when the network packet reaches each network processing step in the process of receiving the network packet, calculate an average delay time by accumulating a given number of network packets for each step, determine whether network performance of the electronic device is sufficient for receiving the network packet by comparing, with a pre-configured first time, the average delay time calculated by accumulating the network packets, and improve the network performance of the electronic device so that the network performance is sufficient for receiving the network packet based on the network performance of the electronic device being determined to be insufficient.

20 Claims, 6 Drawing Sheets

(56) References Cited

U.S. PATENT DOCUMENTS

| | | |
|---|---|---|
| 10,142,236 B2 * | 11/2018 | Toy .................. H04L 47/12 |
| 10,211,947 B2 | 2/2019 | Kim |
| 2007/0242788 A1 | 10/2007 | Huang |
| 2013/0142049 A1 * | 6/2013 | Jim .................. H04W 52/0225 |
| | | 370/241 |
| 2016/0026479 A1 | 1/2016 | Rosenzweig et al. |
| 2016/0218912 A1 | 7/2016 | Vincze et al. |
| 2018/0034687 A1 * | 2/2018 | Kambegawa .......... G06F 13/40 |
| 2019/0363967 A1 | 11/2019 | Yun et al. |

FOREIGN PATENT DOCUMENTS

| | | |
|---|---|---|
| KR | 10-1122877 B1 | 3/2012 |
| KR | 10-1387769 B1 | 4/2014 |
| KR | 101511979 B1 | 4/2015 |
| KR | 101543074 B1 | 8/2015 |
| KR | 10-2017-0110105 A | 10/2017 |
| KR | 1020180075760 A | 7/2018 |
| WO | 2010/082091 A2 | 7/2010 |

* cited by examiner

METHOD AND APPARATUS FOR CONTROLLING TRANSMISSION OF PACKET

CROSS-REFERENCE TO RELATED APPLICATION(S)

This application is a bypass continuation of International Application No. PCT/KR2022/010975, filed on Jul. 26, 2022, which is based on and claims priority to Korean Patent Application No. 10-2021-0105005, filed on Aug. 10, 2021, in the Korean Intellectual Property Office, the disclosures of which are incorporated by reference herein in their entireties.

BACKGROUND

1. Field

The disclosure relates to an electronic device and a method of controlling, by an electronic device, the transmission of a packet, and more particularly, to an electronic device which performs the transmission and reception of packets.

2. Description of Related Art

Various electronic devices, such as a smartphone, a tablet PC, a portable multimedia player (PMP), a personal digital assistant (PDA), a laptop personal computer (PC), and a wearable device, come into use.

An electronic device may use various communication services to exchange packets with an external electronic device. In performing communication with the external electronic device, the electronic device may use various communication services to convert data of a user in a packet form and transmit a packet to the external electronic device.

A related art electronic device may monitor a transmission state of network packets at a relatively large time interval of 1 second. In this case, it may be difficult to quickly handle a network speed variation due to the relatively large time interval of 1 second. In particular, in the case of a high speed network, a large amount of packets may rapidly increase. The related art electronic device may have a packet drop and a low packet reception speed due to an insensitive response. Furthermore, the reason why a packet is delayed or dropped in each layer may be affected by a plurality of factors not one factor. The related art electronic device may have a difficulty in a precise action because the electronic device determines a packet reception situation based on only one factor called a packet reception speed. For this reason, power waste may be caused if an action is taken by executing a boosting operation for packet transmission in all intervals.

Furthermore, the related art electronic device may have a difficulty in an accurate operation because the electronic device does not have a clear reference value when determining a level of a boosting operation for packet transmission. In this case, in a packet transmission process, the electronic device may have a difficulty in a sufficient action in an actual use environment although the electronic device operates without a problem in a development environment. In order to handle such a problem, a numerical value of boosting may be configured to be slightly higher than a numerical value that is actually required. However, in such a case, unnecessary power consumption may be caused. On the contrary, if a numerical value of boosting is configured only as the numerical value is needed, a packet reception time may be delayed because boosting is insufficient in a specific situation, which may lead to deteriorated performance of the electronic device.

SUMMARY

In accordance with an aspect of the disclosure, an electronic device includes a memory configured to store a table containing a delay time corresponding to a network packet reception process, and an operation corresponding to the delay time; and a processor operatively connected to the memory, wherein the memory is configured to store instructions, which when executed by the processor, control the processor to: measure the delay time for each network processing step included in the network packet reception process based on a time when the network packet reaches the each network processing step, calculate an average delay time by accumulating a given number of network packets for the each network processing step, determine whether network performance of the electronic device is sufficient for receiving the network packet by comparing the average delay time with a pre-configured first time, and based on determining that the network performance of the electronic device is insufficient for receiving the network packet, improve the network performance of the electronic device so that the network performance is sufficient for receiving the network packet.

In accordance with an aspect of the disclosure, a method of controlling, by an electronic device, a packet reception speed, includes measuring a delay time corresponding to each network processing step included in a network packet reception process based on a time when a network packet reaches the each network processing step; calculating an average delay time by accumulating a given number of network packets for the each network processing step; determining whether network performance of the electronic device is sufficient for receiving the network packet by comparing the average delay time with a pre-configured first time; and based on determining that the network performance of the electronic device is insufficient for receiving the network packet, controlling to improve the network performance of the electronic device so that the network performance is sufficient for receiving the network packet.

According to various embodiments, the electronic device can execute a boosting operation only if the boosting operation is needed by using a packet processing time actually measured for each step, not an overall packet transmission speed uniformly, with respect to a quality of service (QoS) reference of an operation of receiving a network packet. Accordingly, unnecessary power consumption can be reduced.

According to various embodiments, the electronic device can accurately execute a boosting operation for each interval by measuring a delay time for each layer or for each step, not an overall packet transmission speed uniformly.

According to various embodiments, the electronic device can immediately respond to a network change unlike in a method of measuring a packet reception speed in 1 second unit, and can take a quick action.

MODE FOR THE INVENTION

Figure 1:
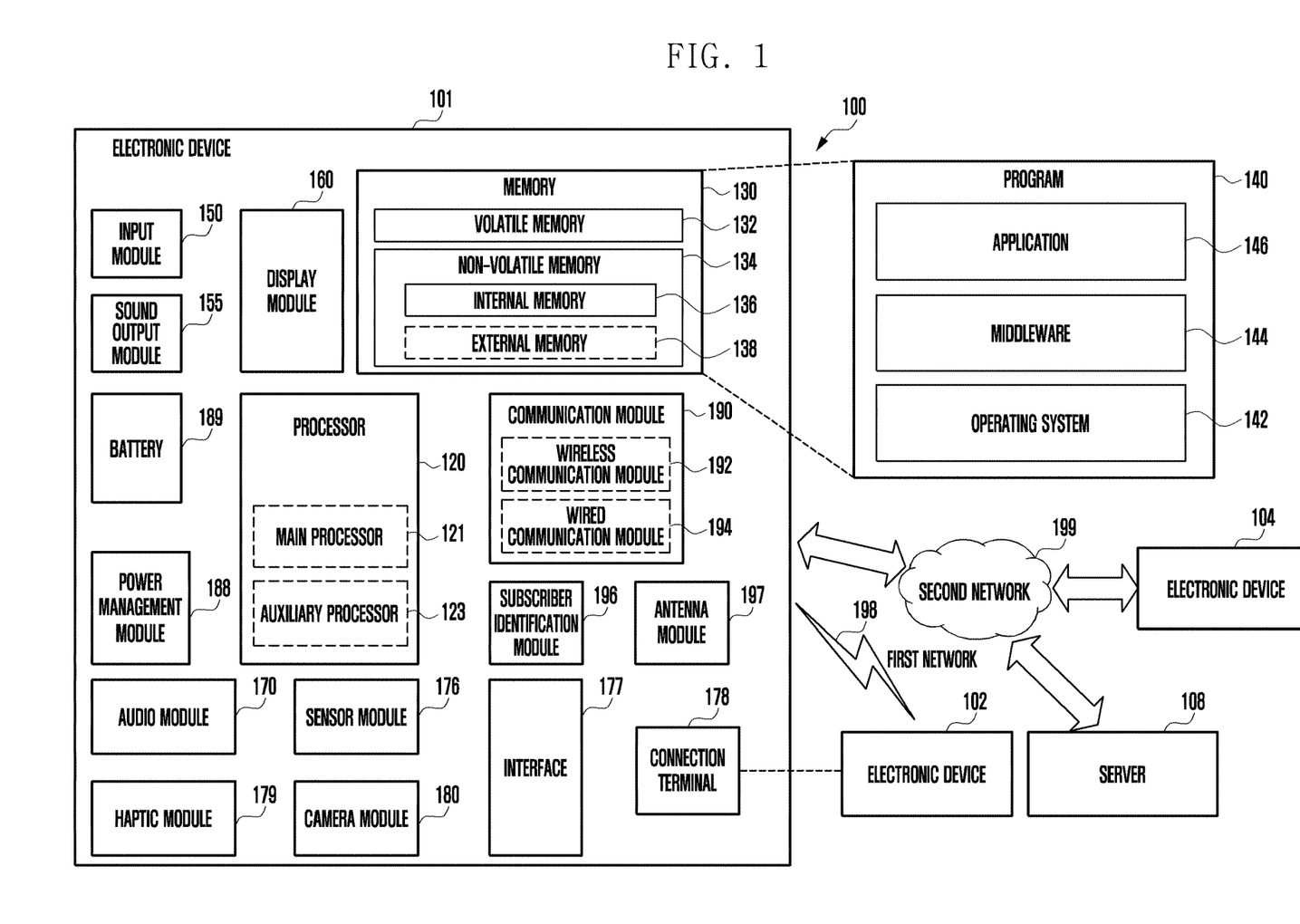
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 over a first network 198 (e.g., a short-range wireless communication network), or at least one of an electronic device 104 or a server 108 over a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various types of data processing or computation. According to one embodiment, as at least a part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network or a combination of two or more of the same, but the disclosure is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., in a wired way) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., in a wired way) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least a part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., in a wired way) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device over the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the aforementioned components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device having a type identical with or different from the type of electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least a part of the function or the service. The one or more external electronic devices receiving the request may perform the at least a part of the function or the service requested, or an additional function or an additional service related to the request, and transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or a client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on a 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of a machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as memory of the manufacturer's server, a server of the application store, or a relay server.

According to various embodiments, each component (e.g., a module or a program) of the aforementioned components may include a single entity or multiple entities, and some of the multiple entities may be separately disposed in different components. According to various embodiments, one or more of the aforementioned components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
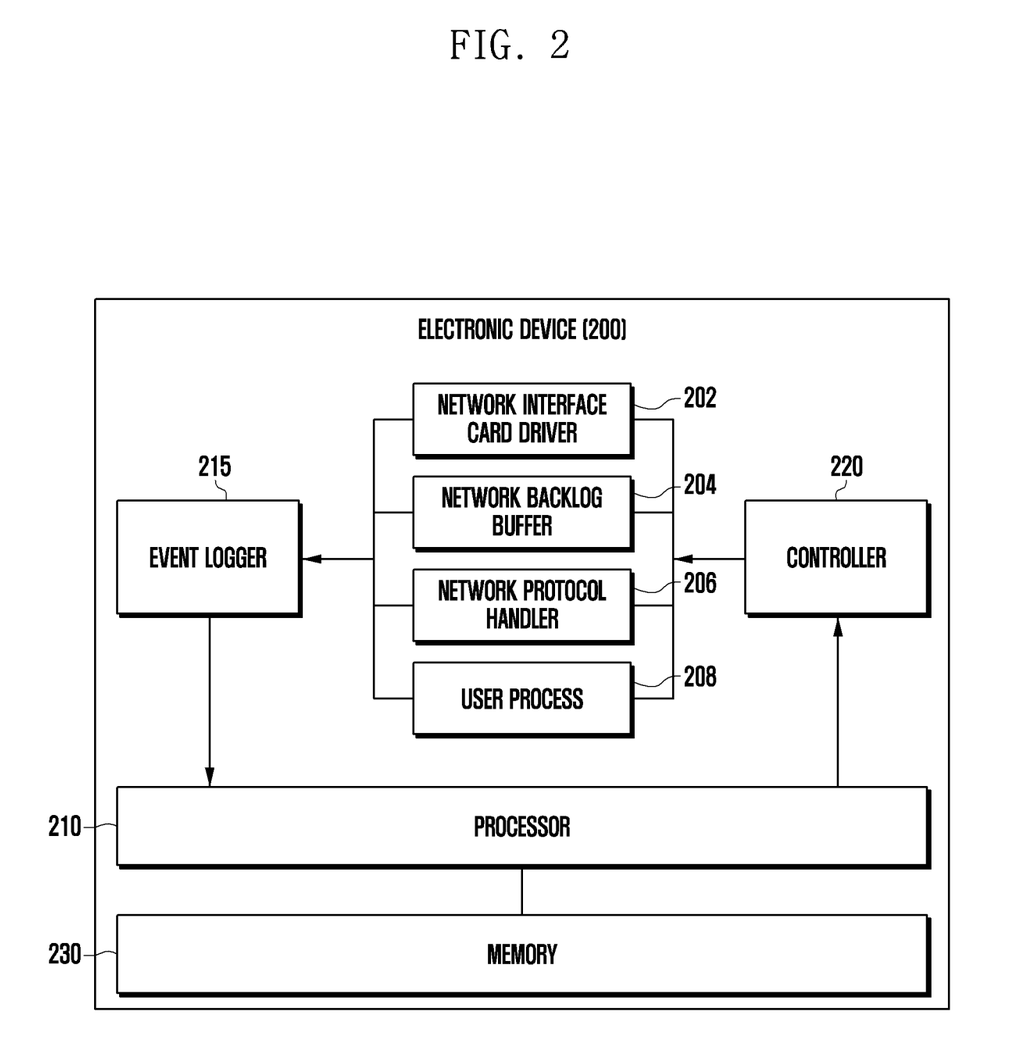
FIG. 2 illustrates, as a block diagram, a construction of an electronic device according to various embodiments.

FIG. 2 illustrates, as a block diagram, a construction of an electronic device according to various embodiments.

An electronic device 200 according to various embodiments may include a network interface card driver 202, a network backlog buffer 204, a network protocol handler 206, a user process 208, a processor 210, an event logger 215, and a memory 230. In embodiments, the event logger 215 may be, for example, a timestamp, or a component which measures, determines, generates, or records timestamps. The electronic device 200 may further include at least some of components and/or functions of the electronic device 101 in FIG. 1. At least some of the components of the electronic device 200 may be mutually operatively, functionally and/or electrically connected.

According to various embodiments, the program 140 in FIG. 1 may include the network interface card driver 202, the network backlog buffer 204, the network protocol handler 206, the user process 208, the processor 210, and the event logger 215.

According to various embodiments, the processor 210 may perform a function for controlling components of the electronic device 200, for example the network interface card driver 202, the network backlog buffer 204, the network protocol handler 206, the user process 208, the event logger 215, and the memory 230. To this end, the processor 210 may be electrically and/or functionally connected to the components of the electronic device 200. An operation and data processing function which may be embodied by the processor 210 within the electronic device 200 will not be limited. However, in various embodiments, a function for adjusting a boosting speed of a packet with respect to a packet reception delay time based on the speed at which packets are actually processed within the electronic device 200 will be described.

According to various embodiments, the processor 210 may be electrically connected to the memory 230. The electronic device 200 may include one or more memories 230. The memory 230 may include a main memory and/or a storage, for example. The main memory may include a volatile memory, such as a dynamic random access memory (DRAM), a static RAM (SRAM), or a synchronous dynamic RAM (SDRAM). The storage may include at least one of a onetime programmable ROM (OTPROM), a PROM, an EPROM, an EEPROM, a mask ROM, a flash ROM, a flash memory, a hard disk, or a solid state drive (SSD), for example. The memory 230 may store information related to a delay time and an operation corresponding to a delay time in a process of receiving a network packet.

According to an embodiment, the memory 230 may be the same as the memory 130 in FIG. 1 or may include at least one component of the memory 130 in FIG. 1. Furthermore, the memory 230 may include the network interface card driver 202, the network backlog buffer 204, the network protocol handler 206, the user process 208, the processor 210, and the event logger 215.

According to various embodiments, the memory 230 may store instructions, which upon execution, control the processor 210 to measure a delay time for each step based on a round trip time of a network packet in a process of receiving the network packet or the time when the network packet reaches each network processing step, calculate an average delay time by accumulating a given number of network packets for each step, determine whether network performance of the electronic device 200 is sufficient for receiving the network packet by comparing, with a first time configured for each step, the average delay time calculated by accumulating the network packets, and based on a determination that the network performance of the electronic device 200 is insufficient, improve the network performance of the electronic device 200 so that the network performance is sufficient for receiving the network packet.

According to various embodiments, the electronic device 200 may include the network interface card driver 202. The network interface card driver 202 may receive data from the outside, for example an outside of the electronic device 200, by using a network. The network interface card driver 202 may transmit such data to a higher layer (e.g., the network backlog buffer 204) in the form of a packet. However, although a data packet has already reached the network interface card driver (NIC) 202, a buffer such as the network backlog buffer 204 may receive a corresponding network packet after first processing a packet of another existing task. Accordingly, a time at which the network packet is received may be generally delayed.

According to various embodiments, a network packet that is received from the outside to the processor 210 may be stored in an internal reception buffer, for example a NIC internal buffer, of the network interface card driver 202. The network interface card driver 202 may receive a network packet, and may transmit the network packet to the internal reception buffer or a designated ring buffer based on a configuration of the network backlog buffer 204. The processor 210 may recognize the reception of the network packet, and may control a corresponding network backlog buffer 204 to perform a software interrupt processing task, for example a soft irq task. The reception buffer or the ring buffer included in the network interface card driver 202 may mean a queue, for example a received queue, which may wait for a network device connection. Such a queue may be allocated to the memory 230. The queue may mean a task sequence list. An insertion operation may be performed on one side of the queue, and a deletion operation may be performed on the other side of the queue.

According to various embodiments, the network backlog buffer 204 may process packets stored in the ring buffer and transmit the packets to a higher layer (e.g., the network protocol handler 206). A buffer and the event logger 215 may be disposed between the network backlog buffer 204 and the network protocol handler 206. An example of a structure including the higher layer and the deployment of the event logger 215 will be described with reference to FIG. 3. The network protocol handler 206 may directly access a packet stored in the ring buffer. Payload data of a data packet processed by the network protocol handler 206 may be stored in a received socket buffer. The user process 208 may obtain a network packet from the network protocol handler 206. Furthermore, the network backlog buffer 204 may store a data packet in a backlog queue of the network protocol handler 206. The backlog queue may mean a queue in a standby state in which a connection request has not been fully processed. A backlog configuration may mean a maximum value of a pending connection queue for an element or component awaiting reception. If the backlog queue is full, a reception request for an additional packet may be rejected. The network protocol handler 206 may process a network packet stored in the backlog queue and store the network packet in a socket queue.

According to various embodiments, the electronic device 200 may control a boosting speed of a transmitted packet using the processor 210. The processor 210 may control a method of processing a network packet in accordance with information of the packet and a delay time. The processor 210 may be operatively connected to the network interface card driver 202, the network backlog buffer 204, the network protocol handler 206, and the user process 208, and may control packet throughput of each of the components. Hereinafter, a boosting operation or a boosting control operation may mean an operation of improving or controlling, by the processor 210, packet throughput of each of the components of the electronic device 200.

According to various embodiments, the electronic device 200 may include the event logger 215 for measuring a packet processing time of each layer. The event logger 215 may be operatively connected to the network interface card driver 202, the network backlog buffer 204, the network protocol handler 206, and the user process 208, may measure a packet processing time of each component, and may transmit information on the packet processing time to the processor 210 and the memory 230. The processor 210 may measure a packet processing time for each layer by using the event logger 215 connected to each layer (e.g., the network interface card driver 202, the network backlog buffer 204, the network protocol handler 206, or the user process 208), and may calculate a delay time by using a pre-configured comparison value. The processor 210 may execute boosting for increasing packet throughput for each network layer based on a calculated delay time for each layer.

The electronic device 200 according to embodiments can reduce unnecessary current consumption by executing boosting only if packets are delayed based on the speed at which the packets are actually processed, and can efficiently maintain a packet transmission speed and quality of service (QoS).

Figure 3:
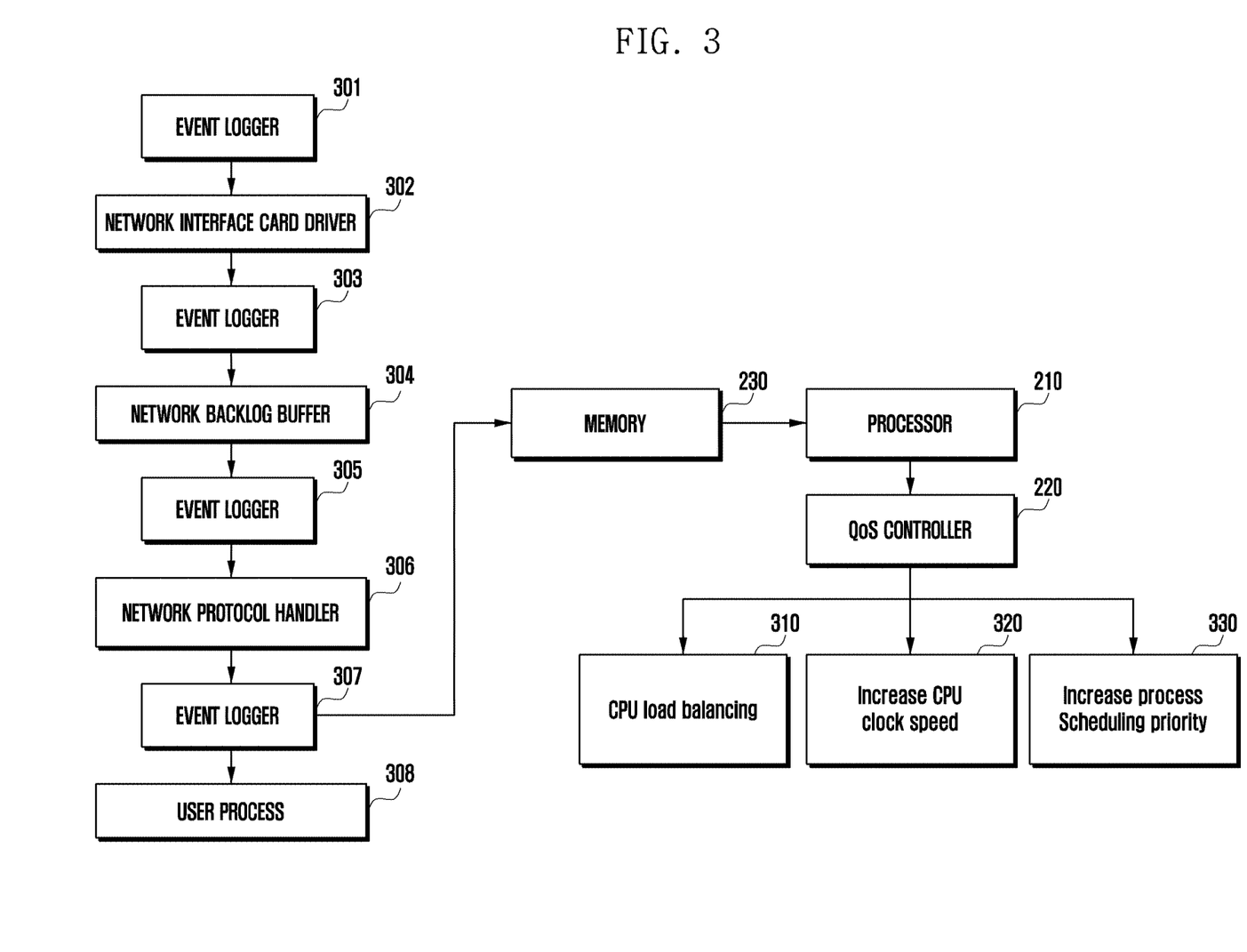
FIG. 3 illustrates a network packet processing structure within an electronic device according to various embodiments.

FIG. 3 illustrates a network packet processing structure within an electronic device according to various embodiments.

An electronic device according to various embodiments, which may for example correspond to the electronic device 200 in FIG. 2, may include a network interface card driver 302, a network backlog buffer 304, a network protocol handler 306, a user process 308, the processor 210, an event logger (e.g., the event logger 215 in FIG. 2), and the memory 230.

Operations of the network interface card driver 302, the network backlog buffer 304, the network protocol handler 306, and the user process 308 may be the same as those described with reference to FIG. 2. The components may be operatively connected to event loggers 301 to 307. The network interface card driver 302 may transmit, to the network backlog buffer 304, a network packet received from the outside. The network backlog buffer 304 may identify and copy the received network packet. In this case, in order to identify and copy the received network packet, a buffer connected to the network backlog buffer 304 may maintain an empty state. If throughput of a network packet in the buffer connected to the network backlog buffer 304 is slower than the speed at which a network packet is transmitted by the network interface card driver 302, the network backlog buffer 304 may have a difficulty in receiving the network packet transmitted by the network interface card driver 302. In such a case, the network interface card driver 302 may retransmit the network packet. When the retransmission occurs, a packet transmission average speed may be reduced and power may also be further consumed.

The network backlog buffer 304 may transmit a received packet to the network protocol handler 306 that performs a corresponding function of each protocol. The network protocol handler 306 may identify whether a received packet and a packet dropped in the network interface card driver 302 in a process of receiving the packet are present. The drop phenomenon may occur because a packet can no longer be received if a buffer of the network backlog buffer 304 disposed in a higher layer of the network interface card driver 302 is emptied at a slow speed. However, such a phenomenon cannot be detected in a step of transmitting a packet from the network interface card driver 302 to the network backlog buffer 304, and may be identified in the network protocol handler 306, that is, a higher layer. When the network protocol handler 306 detects the drop phenomenon, a step of transmitting a packet from the network interface card driver 302 to the network backlog buffer 304, which may be referred to as a first step, and a step of transmitting the packet from the network backlog buffer 304 to the network protocol handler 306, which may be referred to as a second setp, may be repeated. Because the retransmission of the packet including the first step and the second step causes a decrease in the transmission speed and is inefficient in terms of power, it is necessary to improve packet throughput of the network backlog buffer 304 in the previous first step so that the drop phenomenon does not occur.

The network protocol handler 306 may transmit a received packet to the user process 308. The user process 308 may receive a finally copied network packet from the network protocol handler 306. The step of receiving, by the user process 308, the packet from the network protocol handler 306 may be referred to as a third step. The user process 308 may be included in an application that is used by a user. If the speed at which the user process 308 takes a packet is low for each application, a packet transmitted by the network protocol handler 306 may be dropped without being received because a corresponding buffer of the user process 308 is full. In this case, the user process 308 may request the retransmission of a packet from the network protocol handler 306 after processing the existing packet. A performance problem may not relatively greatly occur because the first step and the second step do not need to be performed. If the user process 308 requests the retransmission, however, the processor 210 may require a rapid handling process by adjusting a packet transmission speed because unnecessary power consumption may occur.

According to an embodiment, a process of receiving a network packet within the electronic device 200 may include a first step of receiving, by the network backlog buffer 304, a network packet received by the network interface card driver 302, a second step of receiving, by the network protocol handler 306, the network packet received by the network backlog buffer 304, and a third step of receiving, by the user process 308, the network packet received by the network protocol handler 306.

According to an embodiment, the processor 210 may measure a network packet reception time and a delay time for each step of the first step to the third step by using the event logger 301, event logger 303, event logger 305, and event logger 307 connected to the network interface card driver 302, the network backlog buffer 304, the network protocol handler 306, and the user process. Furthermore, the processor 210 may store the measured network packet reception time and delay time in the memory 230.

According to an embodiment, when an average delay time calculated by accumulating network packets for each step is longer than a first time, the processor 210 may determine that network performance of the electronic device 200 is not sufficient for receiving the network packets. In this case, the first time may be a pre-configured time, and may mean a sufficient time in processing packets while not reducing an incoming speed of the packets in transmitting packets between layers, but the first time is not limited thereto. The first time may be different depending on the amount of data to be processed, a packet transmission time, and a configuration.

According to an embodiment, the processor 210 may determine whether network performance of the electronic device 200 is insufficient for receiving a network packet for each step including the first step to the third step. If it is determined that network performance is insufficient for receiving a network packet for each step, the processor 210 may take an action by performing a boosting operation. The boosting operation may mean an operation of adjusting, by the processor 210, a packet transmission speed in order to maintain network performance. The boosting operation which may be performed by the processor 210 may include an operation of CPU load balancing 310, an operation of increasing a CPU clock speed 320, and an operation of increasing process scheduling priority 330, for example. The operation of CPU load balancing 310 may mean an operation of distributing and processing packets used in one user process 308 by using a plurality of CPUs without processing the packets in one CPU. The operation of increasing a CPU clock speed 320 may mean an operation of configuring a minimum value of a CPU operation clock and processing a packet so that a CPU transmits the packet at a specific speed or more. An operation of increasing process scheduling priority 330 may mean an operation of changing a schedule or priority so that the user process 308 of a corresponding application is preferentially processed.

According to an embodiment, if it is determined that network performance of the electronic device 200 is insufficient for receiving the network packet in the first step, the processor 210 may control the network packet used in the user process 308 to be distributed and processed in a plurality of CPUs without processing the network packet in one CPU.

According to an embodiment, if it is determined that network performance of the electronic device 200 is insufficient for receiving the network packet in the first step, the processor 210 may control a clock speed of a CPU to maintain a given level or more.

According to an embodiment, if it is determined that network performance of the electronic device 200 is insufficient for receiving network packets in the third step, the processor 210 may control a clock speed of a CPU to maintain a given level or more.

According to an embodiment, if it is determined that network performance of the electronic device 200 is insufficient for receiving network packets in the third step, the processor 210 may control to increase scheduling priority of the user process used in the third step.

According to an embodiment, if it is determined that network performance of the electronic device 200 is insufficient for receiving network packets in the second step, the processor 210 may determine such insufficiency as an error, not a transmission speed problem of a packet, and may execute debugging. The debugging may mean a process of discovering and removing a bug or an error in a network protocol of the electronic device 200.

Figure 4:
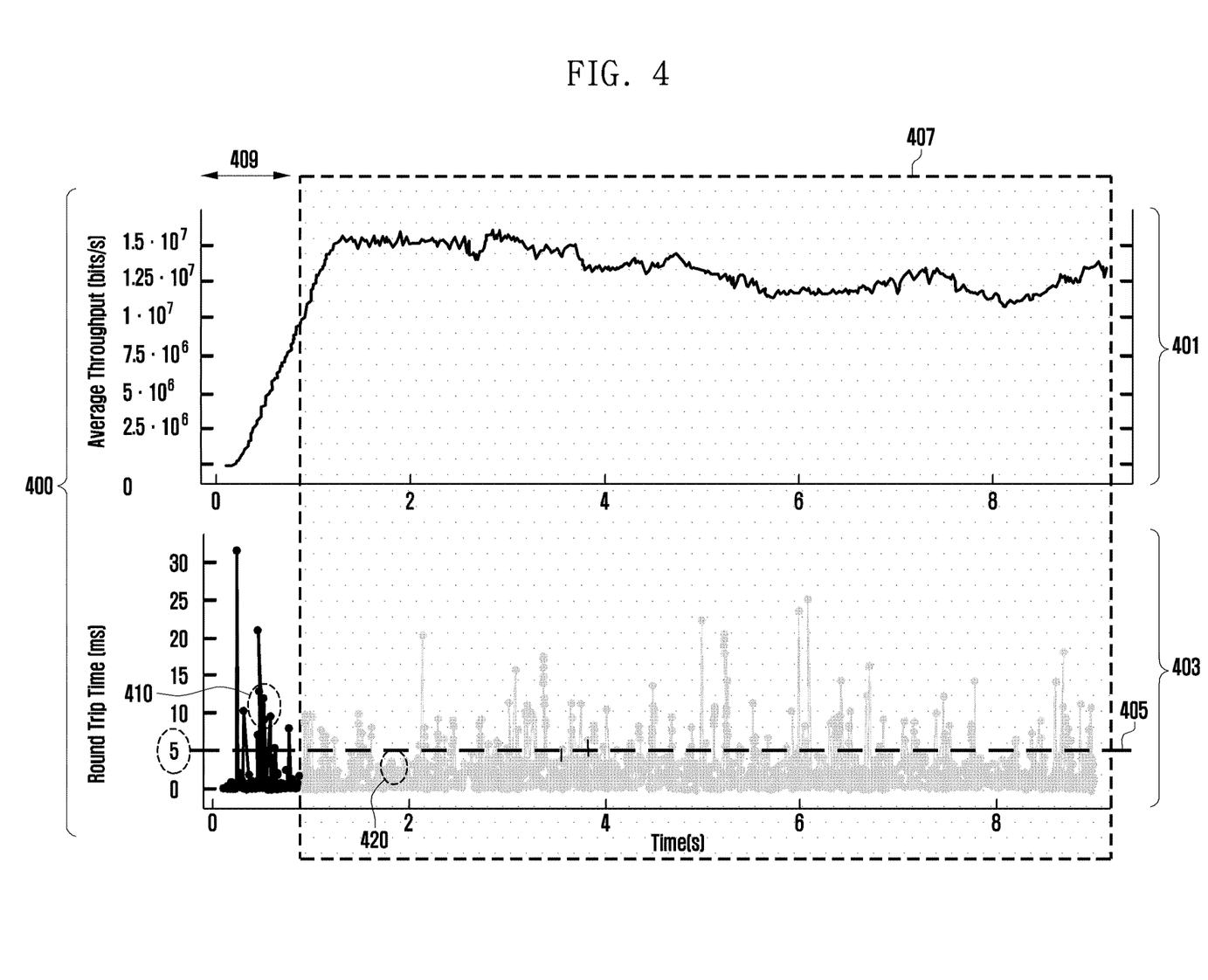
FIG. 4 illustrates, as a graph, a transmission state of network packets in an electronic device according to an embodiment.

FIG. 4 illustrates, as a graph, a transmission state of network packets in a related art electronic device.

The related art electronic device may monitor a transmission state of network packets at a relatively large time interval of 1 second. The related art electronic device may mean an electronic device different from an electronic device according to various embodiments, for example different from the electronic device 200 in FIG. 2. In this case, it may be difficult to rapidly handle a network speed variation due to the relatively large time interval of 1 second. In particular, in the case of a high speed network, a large amount of packets may rapidly increase. The related art electronic device may have a packet drop and a reduced packet reception speed due to an insensitive response. Furthermore, the reason why a packet is delayed or dropped in each layer including a network interface card driver (which may correspond to the network interface card driver 202), a network backlog buffer (which may correspond to the network backlog buffer 204), a network protocol handler (which may correspond to the network protocol handler 206), and a user process (which may correspond to the user process 208) may be affected by a plurality of factors, not just one factor. The related art electronic device may have a difficulty in determining or performing a precise action because the electronic device determines a packet reception situation based on only one factor such as a packet reception speed. Furthermore, the related art electronic device may cause power waste because the electronic device executes a boosting operation for packet transmission in all intervals.

Furthermore, the related art electronic device may have a difficulty in an accurate operation because the electronic device does not have a clear reference value when determining a level of a boosting operation for packet transmission. In this case, in a packet transmission process, the electronic device may have a difficulty in determining or performing a sufficient action in an actual use environment although the electronic device operates without a problem in a development environment. In order to handle such a problem, a numerical value of boosting may be configured to be slightly higher than a numerical value that is actually required. However, in such a case, unnecessary power consumption may be caused. On the contrary, if a numerical value of boosting is configured only as the numerical value is needed, a packet reception time may be delayed because boosting is insufficient in a specific situation, which may lead to deteriorated performance of the electronic device.

A graph 400 in FIG. 4 may include a graph 401 and a graph 403. The graph 401 illustrates, as a graph, packet transmission speeds of the electronic device over time.

According to the graph 401, it may be seen that after a packet transmission start, the transmission speed starts to gradually increase, reaches a peak at about 1.1 second, and then similarly maintains the peak up to 9 seconds, and the transmission is terminated. The related art electronic device may have a difficulty in executing a boosting operation for packet transmission between initial 0 to 1 second, such as an interval 409, because the electronic device monitors the packet transmission speed every second. In this case, it may be difficult to properly execute a boosting operation for packet transmission although a packet processing time is delayed in an interval greater than a first time, such as an interval 410.

The graph 403 illustrates packet round-trip times (RTTs) of the electronic device over time. The RTT may be used as a comparison criterion in describing an operation because values used as the first time in the disclosure are included in the RTT. Hereinafter, for convenience of description, in the graph 403, about 5 ms of the RTT may be used as a comparison criterion for the first time. A processor (which may correspond to the processor 210 in FIG. 2) may compare a transmission time of a packet for each step and each first time by using an event logger (e which may correspond to the event logger 215 in FIG. 2). When the transmission time of a packet for each step is greater than the first time, the processor may determine that packet transmission has been delayed and execute a boosting operation for packet transmission.

According to the graph 400, it may be seen that in an interval 407, the processor executes a boosting operation for packet transmission. The electronic device may execute a boosting operation for packet transmission although a packet RTT is less than the first time as in an interval 420 and performance of the electronic device is sufficient. In this case, unnecessary power waste may occur.

Figure 5:
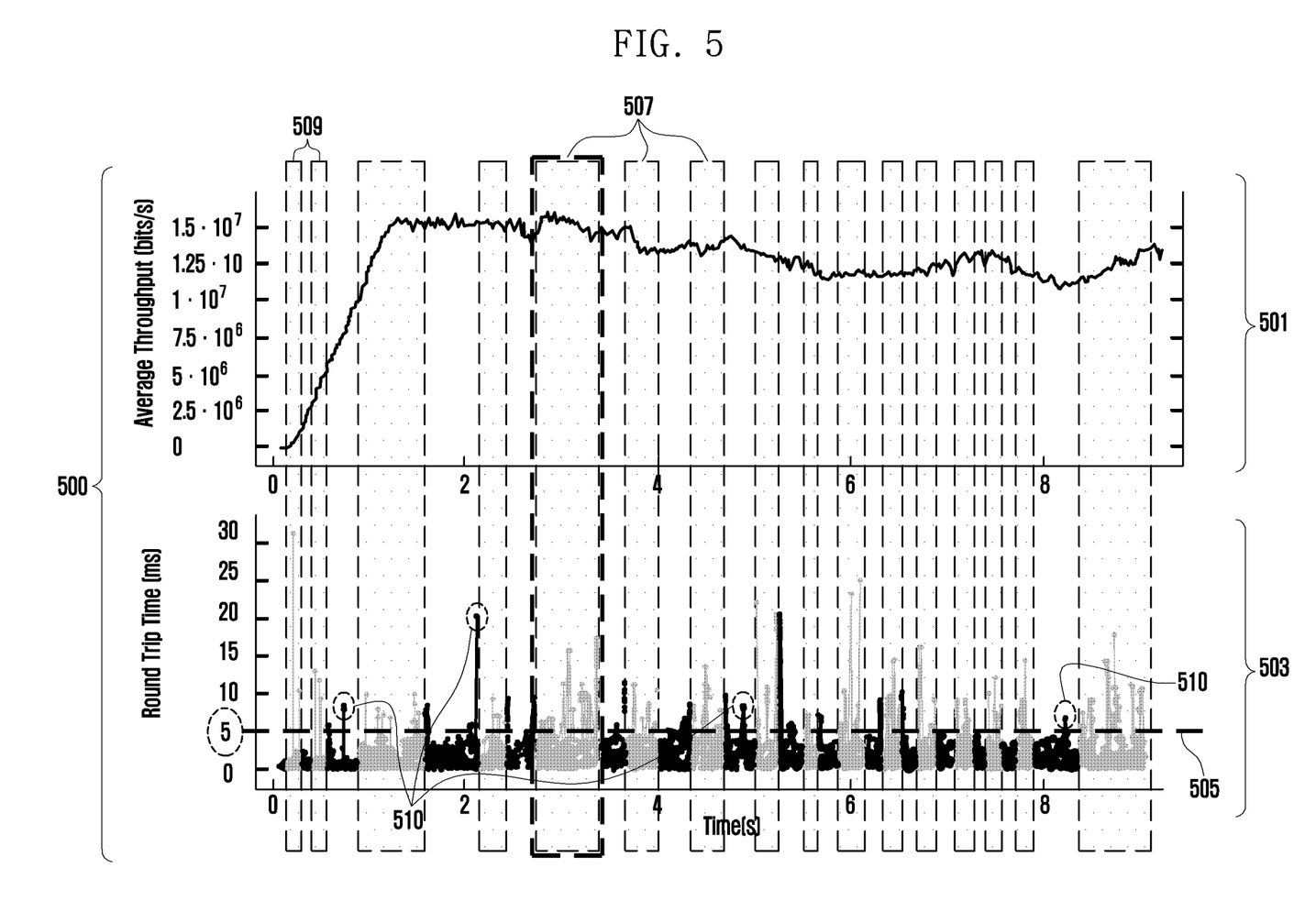
FIG. 5 illustrates, as a graph, a transmission state of network packets in an electronic device according to various embodiments.

FIG. 5 illustrates, as a graph, a transmission state of network packets in an electronic device (e.g., the electronic device 200 in FIG. 2) according to various embodiments.

A graph 500 in FIG. 5 may include a graph 501 and a graph 503. The graph 501 illustrates, as a graph, packet transmission speeds of the electronic device 200 over time. The graph 503 illustrates packet round-trip times (RTTs) of the electronic device 200 over time. The RTT may be used as a comparison criterion in describing an operation because values used as the first time in the disclosure are included in the RTT. Hereinafter, for convenience of description, in the graph 503, about 5 ms of the RTT may be used as a comparison criterion for the first time. The electronic device 200 may determine whether packet transmission has been delayed and whether to execute a boosting operation for packet transmission, based on the first time for each step.

Unlike the related art electronic device in FIG. 4, the electronic device 200 according to various embodiments may execute a boosting operation for packet transmission based on a processing time of a packet. The electronic device 200 may take a rapid action at an early stage before 1 second elapses after a packet transmission start as in an interval 509. Furthermore, the electronic device 200 does not execute a boosting operation for packet transmission in a full interval, but may execute a boosting operation for packet transmission only in an interval in which a packet round-trip time (RTT) is greater than the first time as in an interval 507.

According to an embodiment, it may be difficult to check a packet transmission speed of the electronic device 200 in a packet unit and take an action. The electronic device 200 may calculate an average transmission speed by binding a plurality of packets within a corresponding time in a given time unit, and may take measures. For example, about 10 packets may be used as the number of packets for calculating an average speed in order to rapidly respond at a low speed (about 100 Mbps or less) and about 100 packets may be used as the number of packets for calculating an average speed in order to guarantee a stable operation at a high speed (greater than about 100 Mbps). A criterion for dividing the speed and the number of packets based on the criterion are not limited to the examples, and may be different depending on a packet transmission environment and a configuration of the electronic device 200. As described above, the electronic device 200 executes a boosting operation for packet transmission in an interval unit by binding a plurality of packets. Although throughput of some packets is greater than the first time as in an interval 510, power waste can be prevented without executing a boosting operation for packet transmission.

Figure 6:
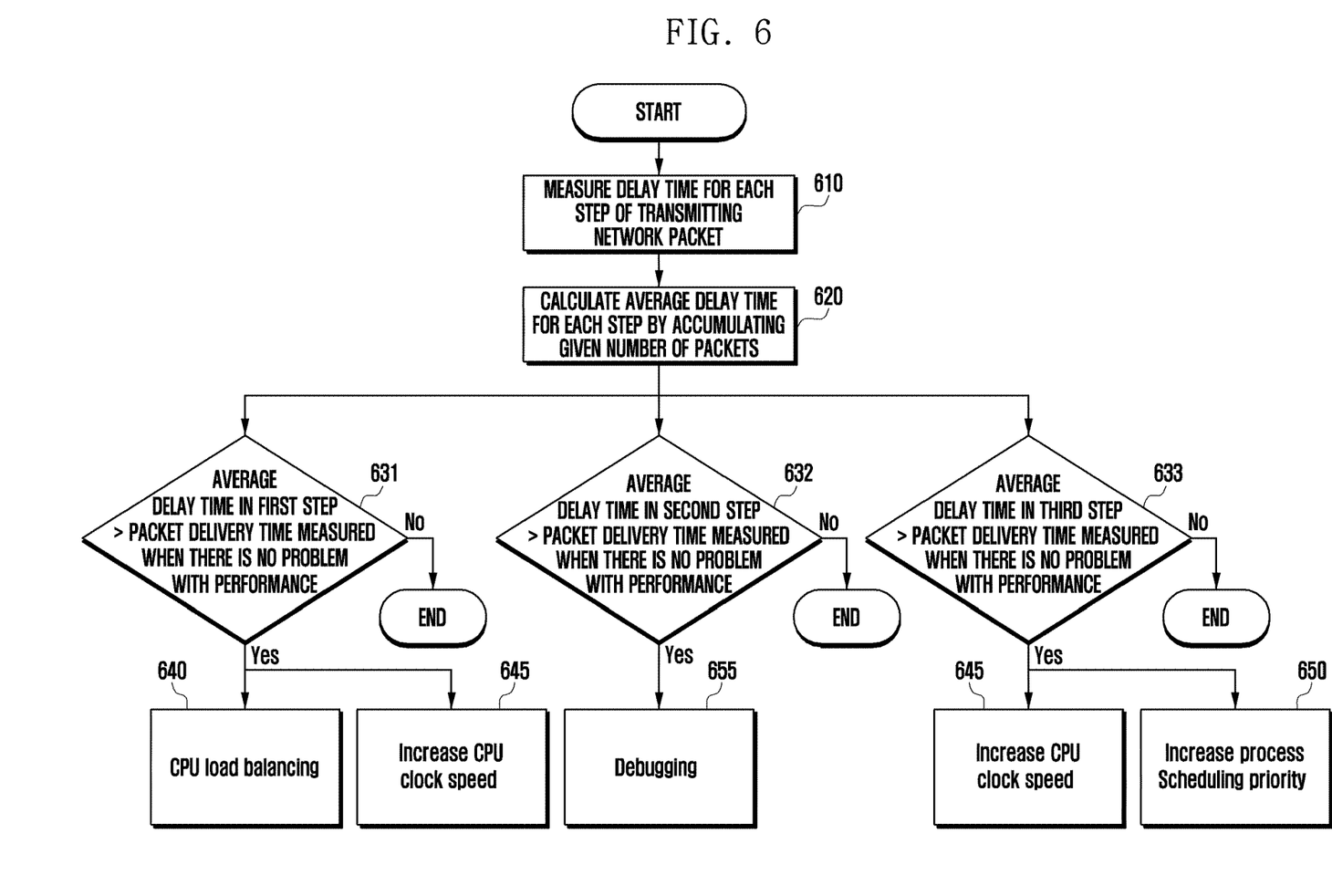
FIG. 6 illustrates, as a flowchart, a method of controlling, by an electronic device, a packet reception speed according to various embodiments.

FIG. 6 illustrates, as a flowchart, a method of controlling, by an electronic device, a packet reception speed according to various embodiments.

The illustrated method 600 may be executed by an electronic device (e.g., the electronic device 200 in FIG. 2) described with reference to FIGS. 1 to 5. Duplicate description may be hereinafter omitted.

According to various embodiments, a method of controlling, by the electronic device 200, a packet reception speed may include an operation of measuring a delay time for each step based on the time when a network packet reaches each network layer in a process of receiving the network packet, an operation of calculating an average delay time by accumulating a given number of network packets for each step, an operation of determining whether network performance of the electronic device 200 is sufficient for receiving the network packets by comparing, with a pre-configured first time, the average delay time calculated by accumulating the network packets, and an operation of controlling to improve the network performance of the electronic device 200 so that the network performance is sufficient for receiving the network packets if it is determined that the network performance of the electronic device 200 is insufficient.

In operation 610, the processor (e.g., the processor 210 in FIG. 2) may measure a delay time for each step of receiving a network packet by using an event logger (e.g., the event logger 215 in FIG. 2). According to an embodiment, a process of receiving a network packet within the electronic device 200 may include processes of a first step of receiving, by a network backlog buffer (e.g., the network backlog buffer 304 in FIG. 3), a network packet received by a network interface card driver (e.g., the network interface card driver 302 in FIG. 3), a second step of receiving, by a network protocol handler (e.g., the network protocol handler 306 in FIG. 3), the network packet received by the network backlog buffer 304, and a third step of receiving, by a user process (e.g., the user process 308 in FIG. 2), the network packet received by the network protocol handler 306.

In operation 620, the processor 210 may calculate an average delay time for each step of receiving a network packet by accumulating a given number of packets by using the event logger 215. According to an embodiment, the processor 210 may check a packet transmission speed of the electronic device 200 in a packet unit, and may have a difficulty in taking a proper action because the number of packets transmitted is many in executing a boosting operation. The electronic device 200 may take an action by calculating an average transmission speed by binding a plurality of packets within a corresponding time in a given time unit. For example, about 10 packets may be used as the number of packets for calculating an average speed in order to rapidly respond at a low speed (about 100 Mbps or less) and about 100 packets may be used as the number of packets for calculating an average speed in order to guarantee a stable operation at a high speed (greater than about 100 Mbps). A criterion for dividing the speed and the number of packets based on the criterion are not limited to the examples, and may be different depending on a packet transmission environment and a configuration of the electronic device 200.

According to an embodiment, the processor 210 may determine whether network performance of the electronic device 200 is insufficient for receiving a network packet for each step including the first step to the third step.

In operation 631, the processor 210 may determine whether an average delay time in the first step is greater than a first time. The first time may mean a time or a packet round-trip time (RTT) taken to transmit packets between layers, and an example of this has been described with reference to FIG. 3. When the transmission time of a packet for each step is greater than the first time, the processor 210 may determine that packet transmission has been delayed and execute a boosting operation for packet transmission.

According to an embodiment, if it is determined that network performance of the electronic device 200 is insufficient for receiving the network packet in the first step, the processor 210 may control the network packet used in the user process 308 to be distributed and processed in a plurality of CPUs without processing the network packet in one CPU.

According to an embodiment, if it is determined that network performance of the electronic device 200 is insufficient for receiving the network packet in the first step, the processor 210 may control a clock speed of a CPU to maintain a given level or more.

When the average delay time in the first step is greater than the first time in operation 631, the processor may execute an operation of CPU load balancing 640. The operation of CPU load balancing 640 may mean an operation of distributing and processing packets used in one user process 308 by using a plurality of CPUs without processing the packets in one CPU, and an example of this has been described with reference to FIG. 3. Furthermore, when the average delay time in the first step is greater than the first time, the processor 210 may execute an operation of increasing a CPU clock speed 645. The operation of increasing a CPU clock speed 645 may mean an operation of configuring a minimum value of a CPU operation clock so that a CPU processes and transmits a packet at a specific speed or more.

According to an embodiment, if it is determined that network performance of the electronic device 200 is insufficient for receiving a network packet in a second step, the processor 210 may determine such insufficiency as an error, not a transmission speed problem of a packet, and may execute debugging.

In operation 632, when an average delay time in the second step is greater than the first time, the processor may execute an operation of debugging 655. The debugging may mean a process of discovering and removing a bug or an error in a network protocol of the electronic device 200.

According to an embodiment, if it is determined that network performance of the electronic device 200 is insufficient for receiving a network packet in the third step, the processor 210 may control a clock speed of a CPU to maintain a given level or more.

According to an embodiment, if it is determined that network performance of the electronic device 200 is insufficient for receiving a network packet in the third step, the processor 210 may control to improve scheduling priority of a user process used in the third step.

In operation 633, when an average delay time in the third step is greater than the first time, the processor 210 may execute the operation of increasing a CPU clock speed 645. The operation of increasing a CPU clock speed 645 may mean an operation of configuring a minimum value of a CPU operation clock so that a CPU processes and transmits a packet at a specific speed or more. Furthermore, when the average delay time in the third step is greater than the first time, the processor 210 may execute an operation of increasing process scheduling priority 650. The operation of increasing process scheduling priority 650 may mean an operation of changing a schedule or priority so that the user process 308 of a corresponding application is preferentially processed. When the average delay time in each step is not greater than the first time, the processor 210 may terminate a process of controlling a packet reception speed without executing a boosting operation in each step.

According to an embodiment, the operation of measuring a delay time for each step based on the time when a network packet reaches each network layer in a process of receiving the network packet may include an operation of measuring a time in the first step of receiving, by the network backlog buffer 304, a network packet received by the network interface card driver 302, an operation of measuring a time in the second step of receiving, by the network protocol handler 306, the network packet received by the network backlog buffer 304, and an operation of measuring a time in the third step of receiving, by the user process 308, the network packet received by the network protocol handler 306.

An electronic device according to various embodiments may include a memory configured to store a table containing a delay time corresponding to a network packet reception processor and an operation corresponding to the delay time, and a processor operatively connected to the memory. The memory may be configured to store instructions, which when executed by the processor, control the processor to measure the delay time for each network processing step included in the network packet reception process based on the time when the network packet reaches the each network processing step, calculate an average delay time by accumulating a given number of network packets for the each network processing step, determine whether network performance of the electronic device is sufficient for receiving the network packet by comparing the average delay time with a pre-configured first time, and based on determining that the network performance of the electronic device is insufficient for receiving the network packet, improve the network performance of the electronic device so that the network performance is sufficient for receiving the network packet.

According to an embodiment, the process of receiving the network packet may include processes of a first step of receiving, by the network backlog buffer, the network packet received by the network interface card driver, a second step of receiving, by the network protocol handler, the network packet received by the network backlog buffer, and a third step of receiving, by the user process, the network packet received by the network protocol handler.

According to an embodiment, the processor may measure a reception time and the delay time of the network packet for each of the first step, the second step, and the third step by using event loggers connected to the network interface card driver, the network backlog buffer, the network protocol handler, and the user process, and may control to store the measured reception time and the delay time in the memory.

According to an embodiment, the processor may determine that the network performance of the electronic device is not sufficient for receiving the network packet based on the average delay time calculated by accumulating the network packets being longer than the pre-configured first time. The pre-configured first time may be pre-configured as a reception time of the network packet, and may include about 5 msec.

According to an embodiment, the processor may determine whether the network performance of the electronic device is insufficient for receiving the network packet for each of the first step, the second step, and the third step.

According to an embodiment, based on the network performance of the electronic device being determined to be insufficient for receiving the network packet in the first step, the processor may control the network packet used in the user process to be distributed and processed in a plurality of CPUs without processing the network packet in one CPU.

According to an embodiment, based on the network performance of the electronic device being determined to be insufficient for receiving the network packet in the first step, the processor may control a clock speed of a CPU to maintain at least a particular level. In embodiments, the particular level may be a predetermined level or a preconfigured level.

According to an embodiment, based on the network performance of the electronic device being determined to be insufficient for receiving the network packet in the third step, the processor may control a clock speed of a CPU to maintain at least a particular level.

According to an embodiment, based on the network performance of the electronic device being determined to be insufficient for receiving the network packet in the third step, the processor may control to improve priority of the user process used in the third step.

According to an embodiment, based on the network performance of the electronic device being determined to be insufficient for receiving the network packet in the second step, the processor may determine that an error has occurred and execute debugging.

According to various embodiments, a method of controlling, by an electronic device, a packet reception speed may include an operation of measuring a delay time corresponding to each network processing step included in a network packet reception process based on the time when the network packet reaches the each network processing step, an operation of calculating an average delay time by accumulating a given number of network packets for the each network processing step, an operation of determining whether network performance of the electronic device is sufficient for receiving the network packet by comparing the average delay time with a pre-configured first, and an operation of, based on determining that the network performance of the electronic device is insufficient for receiving the network packet, controlling to improve the network performance of the electronic device so that the network performance is sufficient for receiving the network packet if it is determined that the network performance of the electronic device is insufficient.

According to an embodiment, the operation of measuring a delay time for each step based on the time when the network packet reaches each network processing step in the process of receiving the network packet may include an operation of measuring a time in a first step of receiving, by the network backlog buffer, the network packet received by the network interface card driver, an operation of measuring a time in a second step of receiving, by the network protocol handler, the network packet received by the network backlog buffer, and an operation of measuring a time in a third step of receiving, by the user process, the network packet received by the network protocol handler.

According to an embodiment, the operation of measuring a delay time for each step based on the time when the network packet reaches each network processing step in the process of receiving the network packet may be executed by using event loggers connected to the network interface card driver, the network backlog buffer, the network protocol handler, and the user process.

According to an embodiment, the pre-configured first time may be pre-configured as a reception time of the network packet, and may include about 5 msec. The operation of determining of whether the network performance of the electronic device is sufficient for receiving the network packet by comparing, with a pre-configured first time, the average delay time calculated by accumulating the network packets may include an operation of determining whether the network performance of the electronic device is not sufficient for receiving the network packet based on the average delay time calculated by accumulating the network packets being longer than the pre-configured first time.

According to an embodiment, the operation of determining whether network performance of the electronic device is sufficient for receiving the network packet by comparing, with a pre-configured first time, the average delay time calculated by accumulating the network packets may include an operation of determining whether the network performance of the electronic device is insufficient for receiving the network packet by comparing, with the pre-configured first time, the time measured in the first step, an operation of determining whether the network performance of the electronic device is insufficient for receiving the network packet by comparing, with the pre-configured first time, the time measured in the second step, and an operation of determining whether the network performance of the electronic device is insufficient for receiving the network packet by comparing, with the pre-configured first time, the time measured in the third step.

According to an embodiment, the operation of controlling to improve the network performance of the electronic device so that the network performance is sufficient for receiving the network packet if it is determined that the network performance of the electronic device is insufficient may include an operation of, based on the network performance of the electronic device being determined to be insufficient for receiving the network packet in the first step, controlling the network packet used in the user process to be distributed and processed in a plurality of CPUs without processing the network packet in one CPU.

According to an embodiment, the operation of controlling to improve the network performance of the electronic device so that the network performance is sufficient for receiving the network packet if it is determined that the network performance of the electronic device is insufficient may include an operation of, based on the network performance of the electronic device being determined to be insufficient for receiving the network packet in the first step, controlling a clock speed of a CPU to maintain a given level or more.

According to an embodiment, the operation of controlling to improve the network performance of the electronic device so that the network performance is sufficient for receiving the network packet if it is determined that the network performance of the electronic device is insufficient may include an operation of, based on the network performance of the electronic device being determined to be insufficient for receiving the network packet in the third step, controlling a clock speed of a CPU to maintain a given level or more.

According to an embodiment, the operation of controlling to improve the network performance of the electronic device so that the network performance is sufficient for receiving the network packet if it is determined that the network performance of the electronic device is insufficient may include an operation of, based on the network performance of the electronic device being determined to be insufficient for receiving the network packet in the third step, controlling to improve priority of a user process used in the third step.

According to an embodiment, the operation of controlling to improve the network performance of the electronic device so that the network performance is sufficient for receiving the network packet if it is determined that the network performance of the electronic device is insufficient may include an operation of, based on the network performance of the electronic device being determined to be insufficient for receiving the network packet in the second step, determining that an error has occurred and executing debugging.

The invention claimed is:

1. An electronic device comprising:
a memory configured to store a table containing a delay time corresponding to a network packet reception process, and an operation corresponding to the delay time; and
a processor operatively connected to the memory,
wherein the memory is configured to store instructions, which when executed by the processor, control the processor to:
determine the delay time for each network processing step from among a plurality of network processing steps included in the network packet reception process based on a time when a network packet reaches the each network processing step, wherein the plurality of network processing steps comprises a first network processing step and a second network processing step that is different from the first step,
calculate an average delay time for the each network processing step by accumulating a given number of network packets,
determine whether network performance of the electronic device is sufficient for receiving the network packet in at least one of the first network processing step and the second network processing step by comparing the average delay time with a pre-configured first time, and
based on determining that the network performance of the electronic device is insufficient for receiving the network packet, adjust an operating characteristic of the electronic device so that the network performance is sufficient for receiving the network packet.

2. The electronic device of claim 1, wherein the process of receiving the network packet comprises:
a first step of receiving, by a network backlog buffer, the network packet received by a network interface card driver,
a second step of receiving, by a network protocol handler, the network packet received by the network backlog buffer, and
a third step of receiving, by a user process, the network packet received by the network protocol handler.

3. The electronic device of claim 2, wherein the processor is further configured to:
determine a reception time and the delay time of the network packet for each of the first step, the second step, and the third step by using event loggers connected to the network interface card driver, the network backlog buffer, the network protocol handler, and the user process, and
control to store the determined reception time and the delay time in the memory.

4. The electronic device of claim 2, wherein the processor is further configured to determine that the network performance of the electronic device is not sufficient for receiving the network packet based on the average delay time calculated by accumulating the network packets being longer than the pre-configured first time, and
wherein the pre-configured first time is pre-configured as a reception time of the network packet.

5. The electronic device of claim 2, wherein the processor is further configured to determine whether the network performance of the electronic device is insufficient for receiving the network packet for each of the first step, the second step, and the third step.

6. The electronic device of claim 5, wherein based on the network performance of the electronic device being determined to be insufficient for receiving the network packet in the first step, the processor is further configured to control the network packet used in the user process to be distributed and processed in a plurality of central processing units (CPUs) without processing the network packet in one CPU.

7. The electronic device of claim 5, wherein based on the network performance of the electronic device being determined to be insufficient for receiving the network packet in the first step, the processor is further configured to control a clock speed of a CPU to maintain at least a particular level.

8. The electronic device of claim 5, wherein based on the network performance of the electronic device being determined to be insufficient for receiving the network packet in the third step, the processor is further configured to control a clock speed of a CPU to maintain at least a particular level.

9. The electronic device of claim 5, wherein based on the network performance of the electronic device being determined to be insufficient for receiving the network packet in the third step, the processor is further configured to control to improve priority of the user process used in the third step.

10. The electronic device of claim 5, wherein based on the network performance of the electronic device being determined to be insufficient for receiving the network packet in the second step, the processor is further configured to determine that an error has occurred and execute debugging.

11. A method of controlling, by an electronic device, a packet reception speed, comprises:
determining a delay time corresponding to each network processing step from among a plurality of network processing steps included in a network packet reception process based on a time when a network packet reaches the each processing step, wherein the plurality of network processing steps comprises a first network processing step and a second network processing step that is different from the first step;
calculating an average delay time by accumulating a given number of network packets for the each network processing step;
determining whether network performance of the electronic device is sufficient for receiving the network packet at least one of the first network processing step and the second network processing step by comparing the average delay time with a pre-configured first time; and based on determining that the network performance of the electronic device is insufficient for receiving the network packet, controlling to adjust an operating characteristic of the electronic device so that the network performance is sufficient for receiving the network packet.

12. The method of claim 11, wherein the measuring the delay time comprises:
   determining a time in a first step of receiving, by a network backlog buffer, the network packet received by a network interface card driver;
   determining a time in a second step of receiving, by a network protocol handler, the network packet received by the network backlog buffer; and
   determining a time in a third step of receiving, by a user process, the network packet received by the network protocol handler.

13. The method of claim 12, wherein the delay time is determined using event loggers connected to the network interface card driver, the network backlog buffer, the network protocol handler, and the user process.

14. The method of claim 12, wherein the pre-configured first time is pre-configured as a reception time of the network packet, and
   wherein the determining of whether the network performance of the electronic device is sufficient comprises determining that the network performance of the electronic device is not sufficient for receiving the network packet based on the average delay time calculated by accumulating the network packets being longer than the pre-configured first time.

15. The method of claim 14, wherein the determining of whether the network performance of the electronic device is sufficient comprises:
   determining whether the network performance of the electronic device is insufficient for receiving the network packet by comparing, with the pre-configured first time, the time determined in the first step;
   determining whether the network performance of the electronic device is insufficient for receiving the network packet by comparing, with the pre-configured first time, the time determined in the second step; and
   determining whether the network performance of the electronic device is insufficient for receiving the network packet by comparing, with the pre-configured first time, the time determined in the third step.

16. The method of claim 15, wherein the controlling to improve the network performance of the electronic device comprises, based on the network performance of the electronic device being determined to be insufficient for receiving the network packet in the first step, controlling the network packet used in the user process to be distributed and processed in a plurality of CPUs without processing the network packet in one CPU.

17. The method of claim 15, wherein the controlling to improve the network performance of the electronic device comprises, based on the network performance of the electronic device being determined to be insufficient for receiving the network packet in the first step, controlling a clock speed of a CPU to maintain at least a particular level.

18. The method of claim 15, wherein the controlling to improve the network performance of the electronic device comprises, based on the network performance of the electronic device being determined to be insufficient for receiving the network packet in the third step, controlling a clock speed of a CPU to maintain at least a predetermined level.

19. The method of claim 15, wherein the controlling to improve the network performance of the electronic device comprises, based on the network performance of the electronic device being determined to be insufficient for receiving the network packet in the third step, controlling to improve priority of the user process used in the third step.

20. The method of claim 15, wherein the controlling to improve the network performance of the electronic device comprises, based on the network performance of the electronic device being determined to be insufficient for receiving the network packet in the second step, determining that an error has occurred and executing debugging.

* * * * *